US012643225B2

(12) United States Patent
Gutman

(10) Patent No.: US 12,643,225 B2
(45) Date of Patent: Jun. 2, 2026

(54) MANIPULATOR FOR ROTARY-LINEAR MOTION IN VACUUM

(71) Applicant: Applied Materials Israel Ltd., Rehovot (IL)

(72) Inventor: Asaf Gutman, Rehovot (IL)

(73) Assignee: Applied Materials Israel Ltd., Rehovot (IL)

( * ) Notice: Subject to any disclaimer, the term of this patent is extended or adjusted under 35 U.S.C. 154(b) by 96 days.

(21) Appl. No.: 18/769,056

(22) Filed: Jul. 10, 2024

(65) Prior Publication Data

US 2026/0014697 A1 Jan. 15, 2026

(51) Int. Cl.
B25J 9/10 (2006.01)
B25J 9/00 (2006.01)

(52) U.S. Cl.
CPC ............ B25J 9/108 (2013.01); B25J 9/0009 (2013.01)

(58) Field of Classification Search
CPC ... H01J 2237/20214; H01J 2237/20221; H01J 37/20; B25J 9/0009; G02B 21/32; G01N 23/2204
See application file for complete search history.

(56) References Cited

U.S. PATENT DOCUMENTS 4,891,516 A * 1/1990 Balter .................. H01J 37/023
250/455.11
11,810,765 B2 11/2023 Gutman et al.

* cited by examiner

*Primary Examiner* — Randell J Krug
(74) *Attorney, Agent, or Firm* — Kilpatrick Townsend & Stockton LLP

(57) ABSTRACT

A manipulator that includes a vacuum chamber interface that is configured to be detachably coupled to a vacuum chamber, a shaft, a proximal enclosure, a proximal housing, a distal housing, a rotational movement unit configured to translate a rotational movement of the distal housing to a rotational movement of the shaft, a linear movement unit configured to translate a linear movement of the distal housing to a linear movement of the shaft and of the proximal enclosure, a rotational movement bellows configured to maintain a vacuum environment around the shaft during the rotational movement of the shaft, and a linear movement bellows configured to maintain the vacuum environment around the shaft during the linear movement of the shaft.

11 Claims, 8 Drawing Sheets

MANIPULATOR FOR ROTARY-LINEAR MOTION IN VACUUM

BACKGROUND

Vacuumed chambers are used in various object evaluation systems and, additionally or alternatively, in various object manufacturing systems. An example of an object evaluation system may include a scanning electron microscope, a charged particle imager, and the like.

The vacuumed chamber and any object within the vacuumed chamber aggregated contaminates.

The vacuumed chamber can be cleaned by using a reactive particles supply system that directs a stream of reactive particles into the vacuumed chamber.

The stream of reactive particles significantly increases the vacuum pressure within the vacuumed chamber.

U.S. Pat. No. 11,810,765 titled "Reactive particles supply system" illustrates a cleaning system that has cleaning modes that differ from each other by values of a reactive particles condition.

Lower values of an output reactive particles condition provides slower cleaning rates but less interference with the require vacuum pressure within the vacuumed chamber. Higher values of the output reactive particles condition provide faster cleaning rates but may result in more significant disturbances to the vacuumed chamber.

The cleaning system illustrates an aperture holder that is rotated between different positions thereby selectively placing one of an apertures held by the aperture holder within the path of a steam of reactive particles. The apertures differ from each other—and are associated with different values of the reactive particles condition.

The aperture holder is rotated by using a handle that controls an axis of rotation of the aperture holder.

While the handle is located outside the vacuumed chamber, the aperture holder and some other parts of the cleaning system are exposed to the vacuum within the vacuumed chamber.

One or more synthetic polymer seals are used to seal the vacuumed chamber from the environment, but due to the significant difference between the vacuum levels within the vacuum chamber and the atmospheric pressure levels of the environments, the one or more synthetic polymer seals leak and compromises the vacuum level of the chamber and exhibit a short life span.

There is a growing need to provide a durable manipulator.

SUMMARY

According to an embodiment, there is provided a manipulator. The manipulator includes (a) a vacuum chamber interface that is configured to be detachably coupled to a vacuum chamber; (b) a shaft; (c) a proximal enclosure that surrounds a proximal portion of the shaft; wherein the shaft, when positioned at a proximal position, extends through the vacuum chamber interface; (d) a proximal housing that surrounds the proximal enclosure; (e) a distal housing; (f) a rotational movement unit configured to translate a rotational movement of the distal housing to a rotational movement of the shaft; (g) a linear movement unit configured to translate a linear movement of the distal housing to a linear movement of the shaft and of the proximal enclosure; (h) a rotational movement bellows configured to maintain a vacuum environment around the shaft during the rotational movement of the shaft; and (i) a linear movement bellows configured to maintain the vacuum environment around the shaft during the linear movement of the shaft.

BRIEF DESCRIPTION OF THE DRAWINGS

The subject matter regarded as the embodiment is particularly pointed out and distinctly claimed in the concluding portion of the specification. The embodiment, however, both as to organization and method of operation, together with specimen s, features, and advantages thereof, may best be understood by reference to the following detailed description when read with the accompanying drawings in which:

DETAILED DESCRIPTION OF THE DRAWINGS

There is provided a manipulator that is compact and durable. The manipulator is mostly located outside a vacuum chamber and is configured to move a proximal edge of the shaft within the vacuum chamber, while maintaining vacuum within an interior part of the manipulator. The vacuum is maintained by bellows that are either welded or fastened to other parts of the manipulator. According to an embodiment that bellows are made of metal, are durable and exhibit a long life span and leak-free operation.

According to an embodiment, the manipulator has a torque selector for selecting the amount of torque to be transmitted to the manipulator inner shaft-thereby providing different tradeoffs between durability and torque.

According to an embodiment, and for safety reasons, manipular is configured to prevent rotation until a defined linear movement of a distal housing of the manipulator is completed. The safety reasons include, for example, preventing an aperture holder from being rotated before the aperture holder is spaced apart from other parts of the system.

According to an embodiment the stroke of a shaft of the manipulator is easily changed by replacing a detachable cover 161 that has an opening that defines the linear stroke.

According to an embodiment, the manipulator enables the shaft to perform a combined motion of three hundred and sixty degrees in rotation movement and a liner movement.

Figure 1:
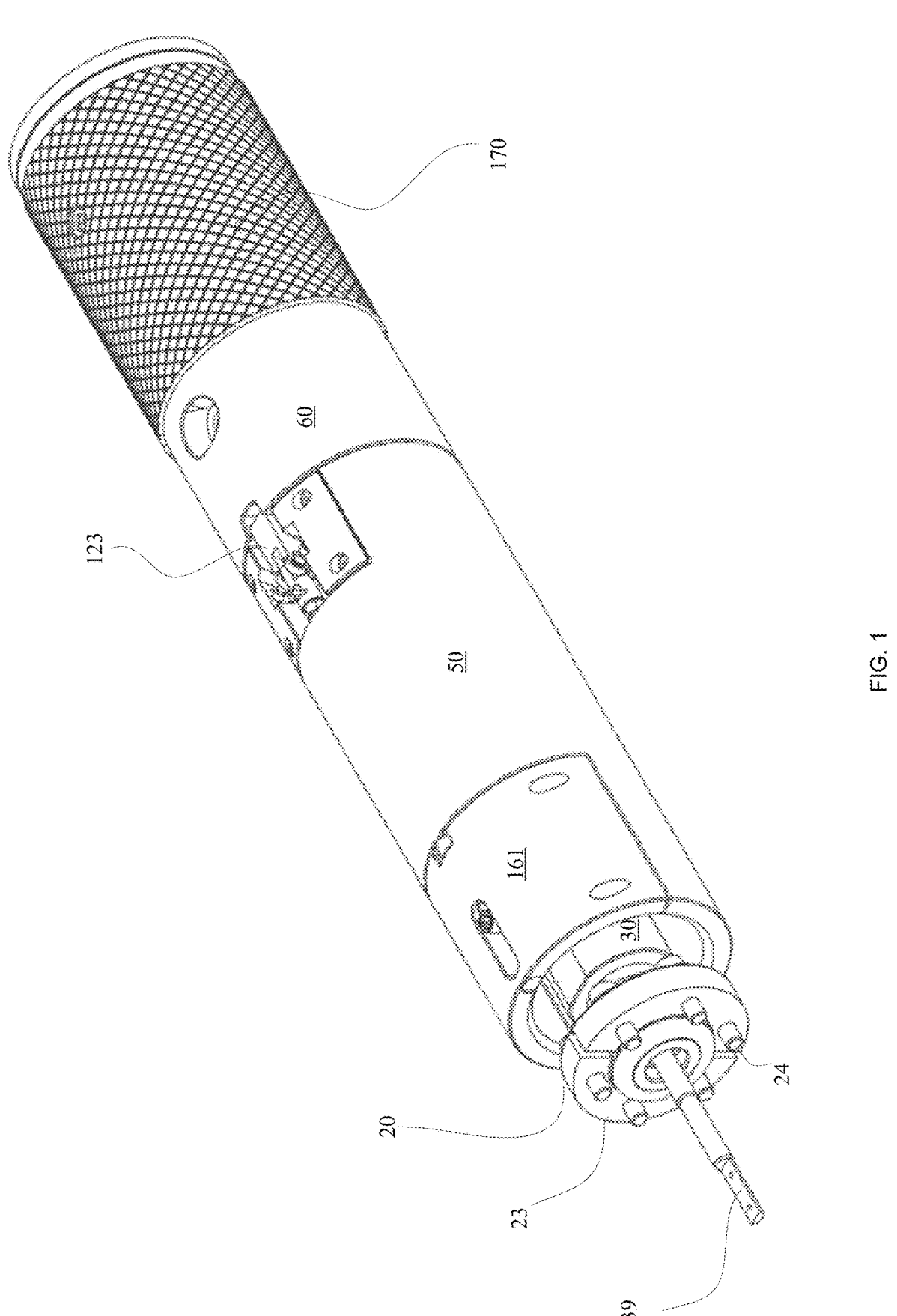
FIG. 1 illustrates an example of an isometric view of a manipulator.
Figure 2:
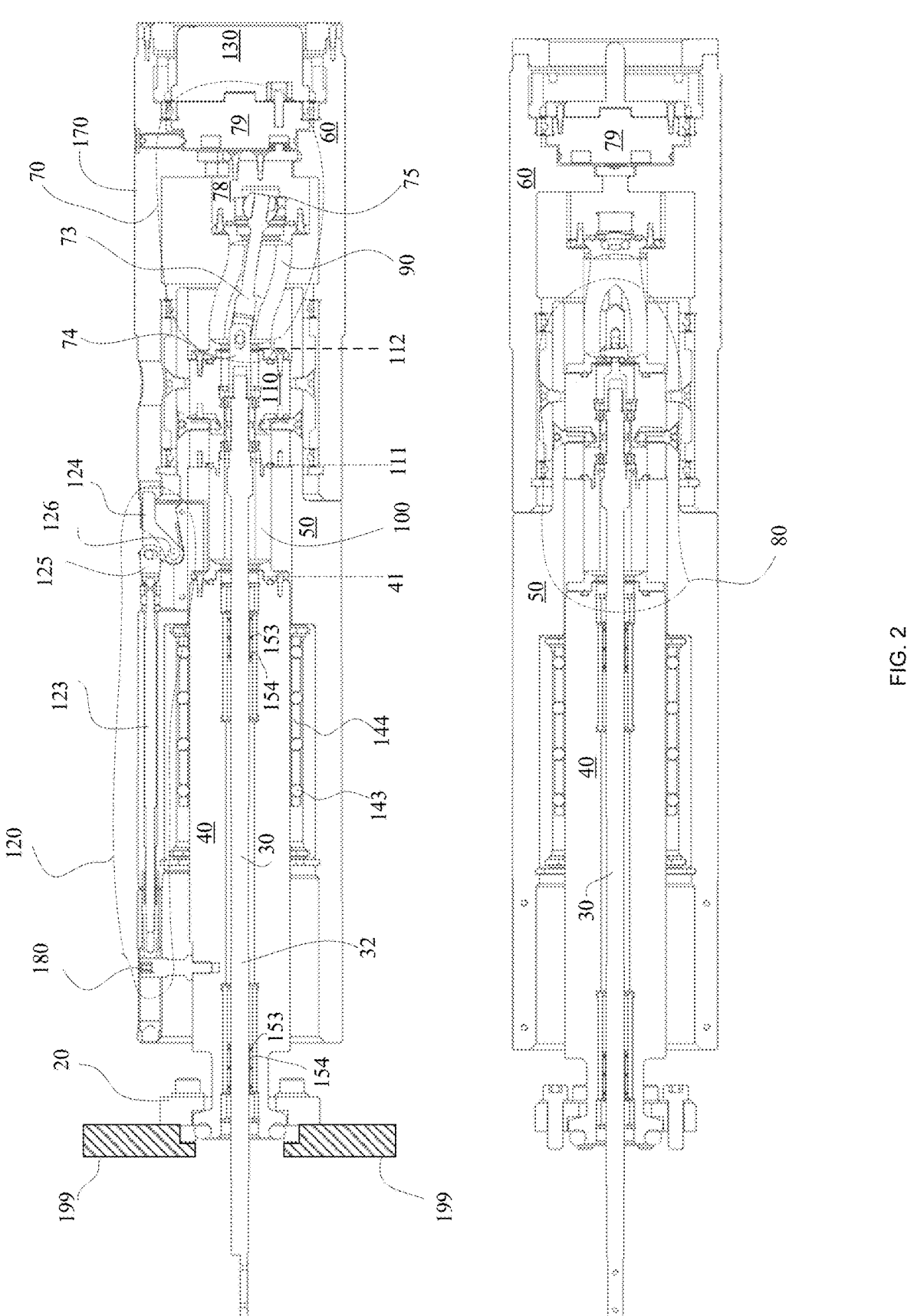
FIG. 2 illustrates an example of a horizontal cross sectional view of a manipulator and of a vertical cross sectional view of the manipulator.
Figure 3:
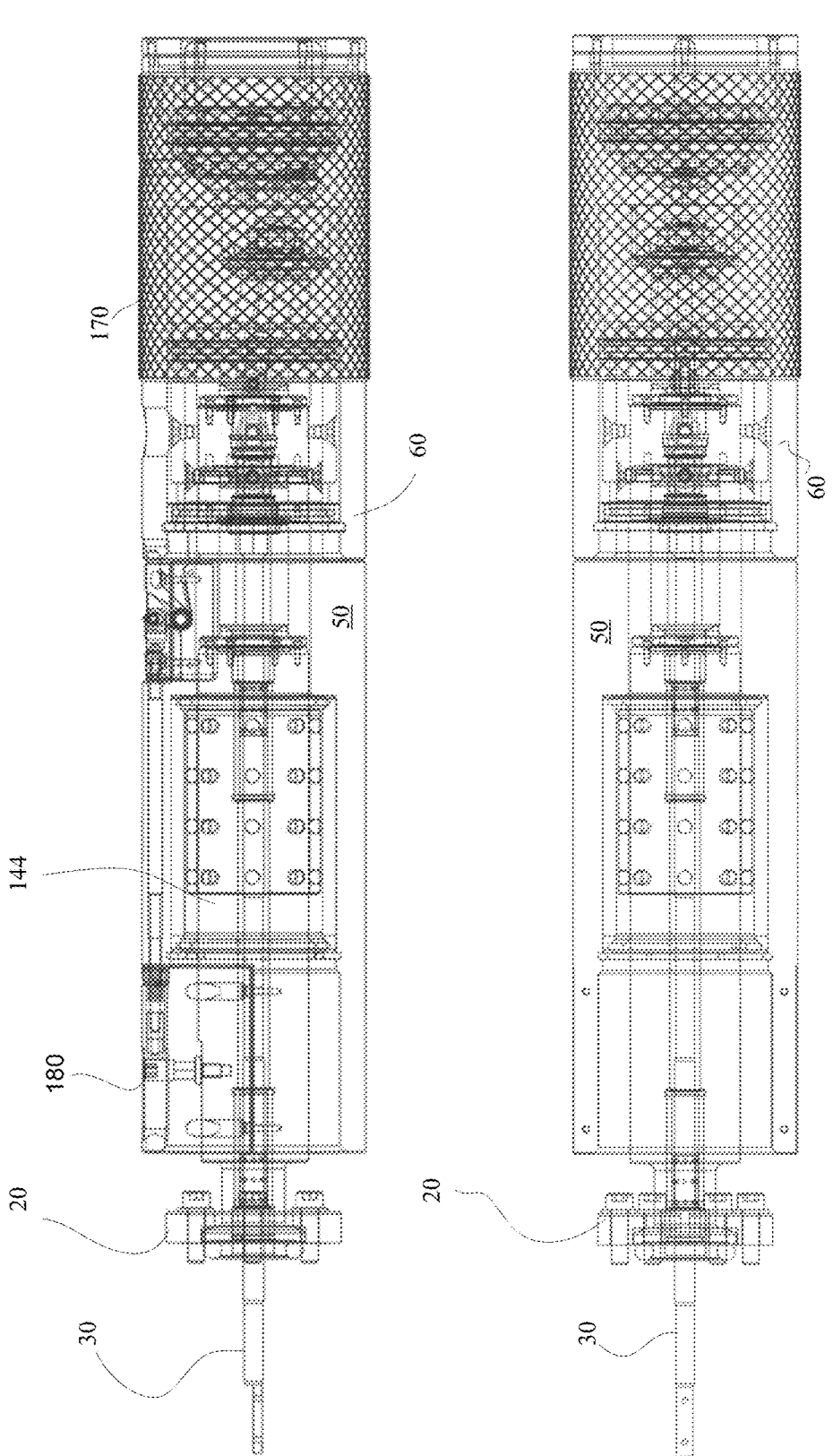
FIG. 3 illustrates an example of a top view of a manipulator and of a front view of the manipulator.
Figure 4:
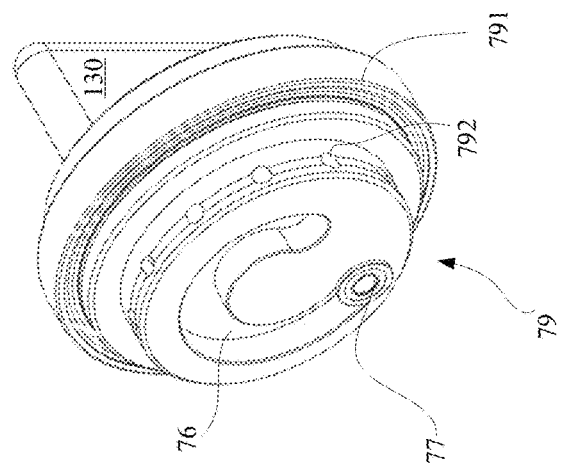
FIG. 4 illustrates an example of parts of a rotational movement unit the manipulator.
Figure 5:
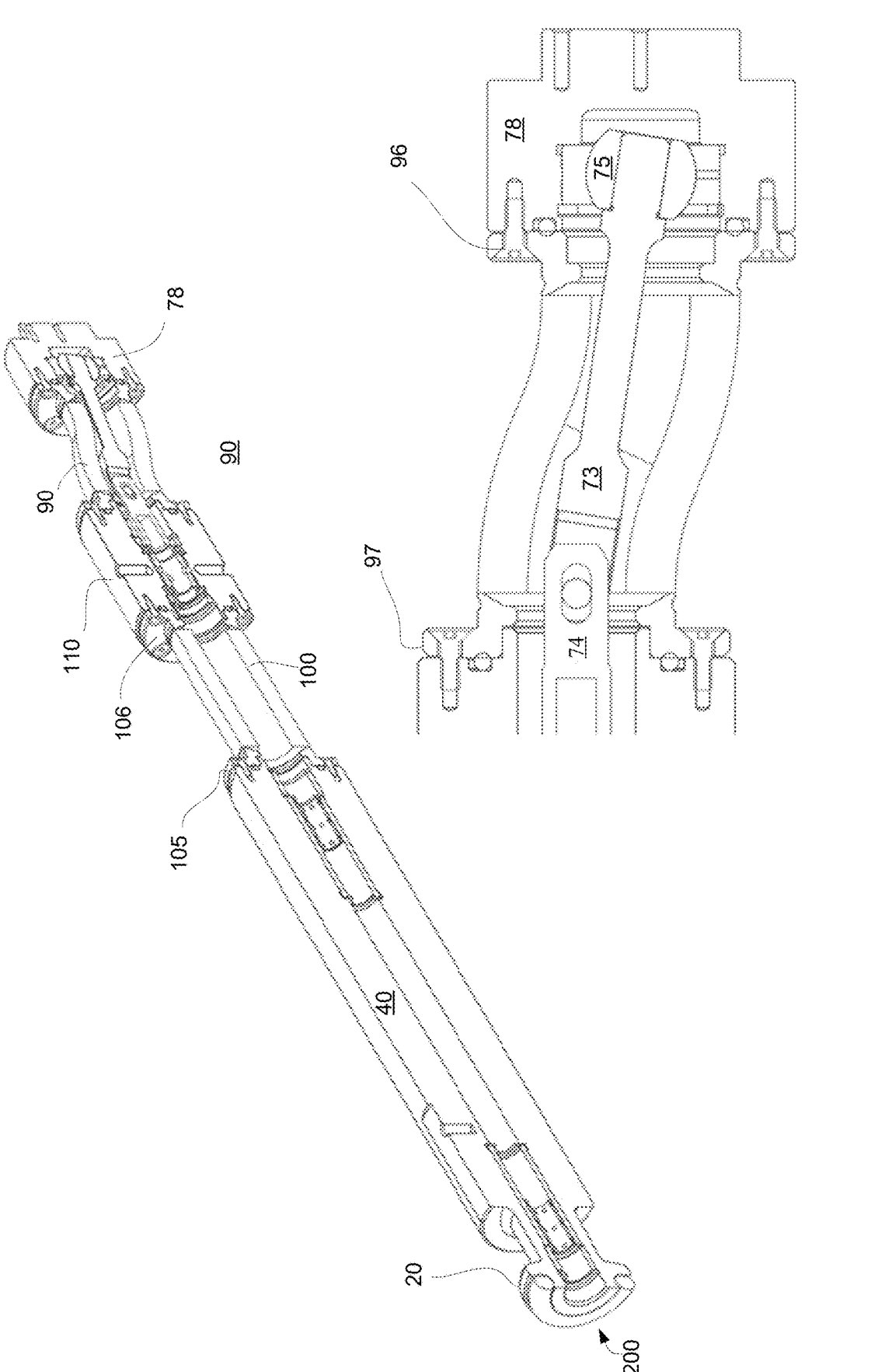
FIG. 5 illustrates an example of a vertical cross-sectional view of some parts of a manipulator.
Figure 6:
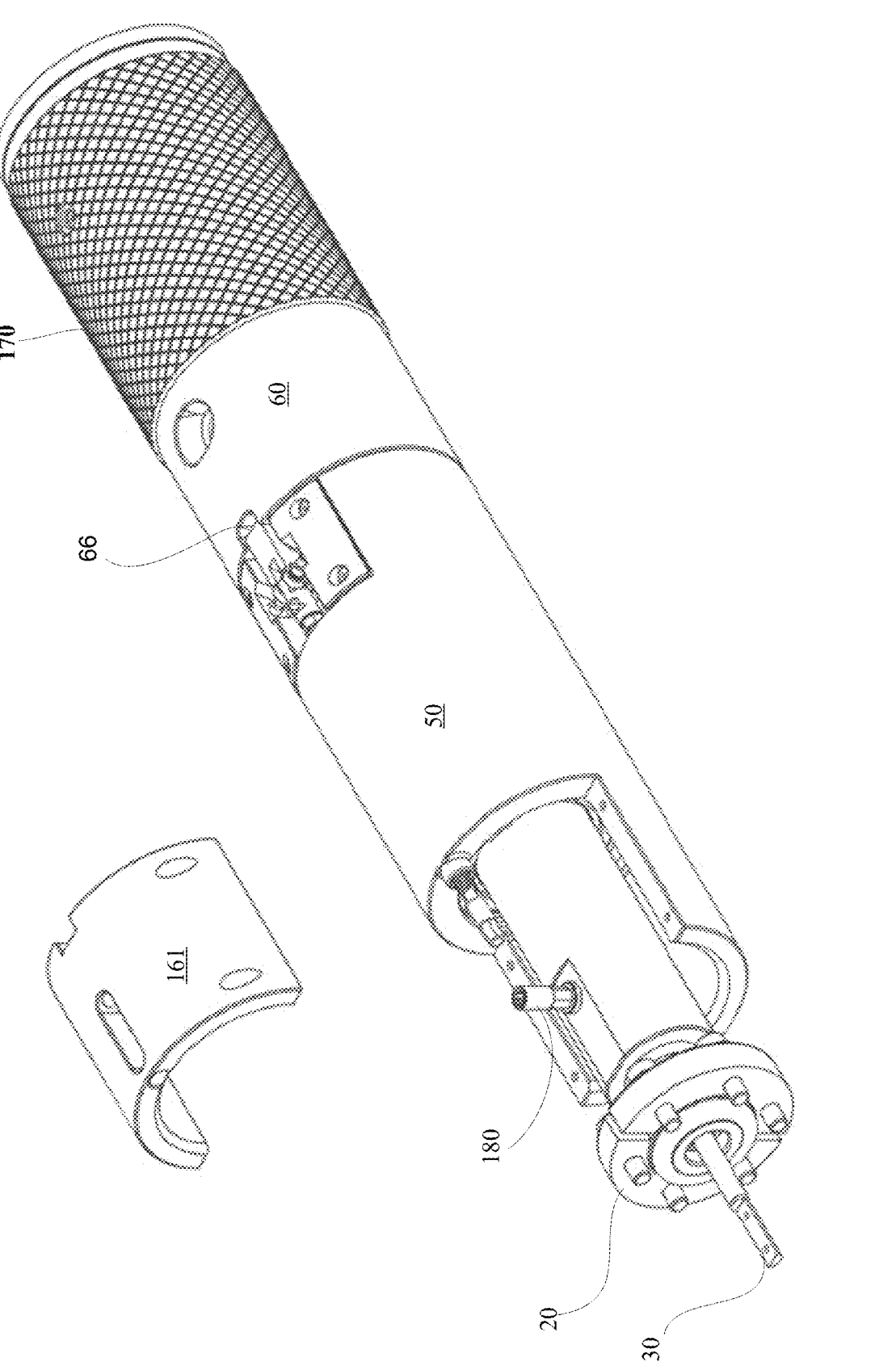
FIG. 6 illustrates an example of an isometric view of a manipulator and of a removable cover.
Figure 7:
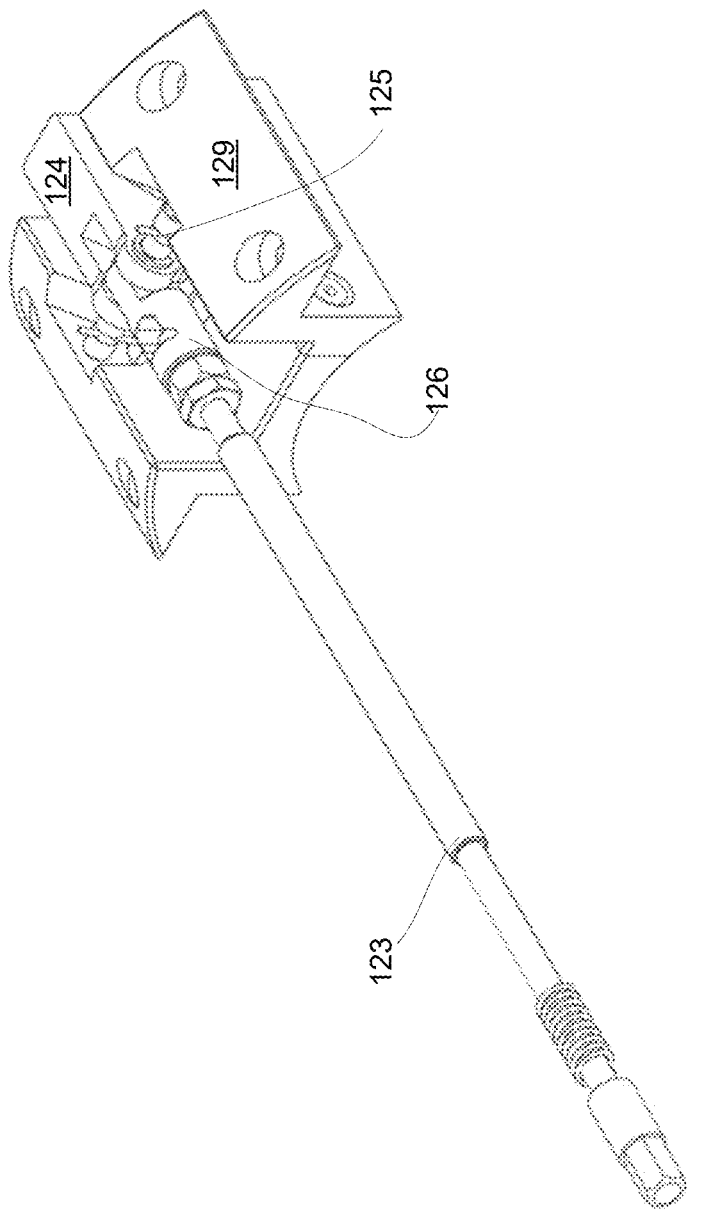
FIG. 7 illustrates an example of an isometric view of a rotational limiter.
Figure 8:
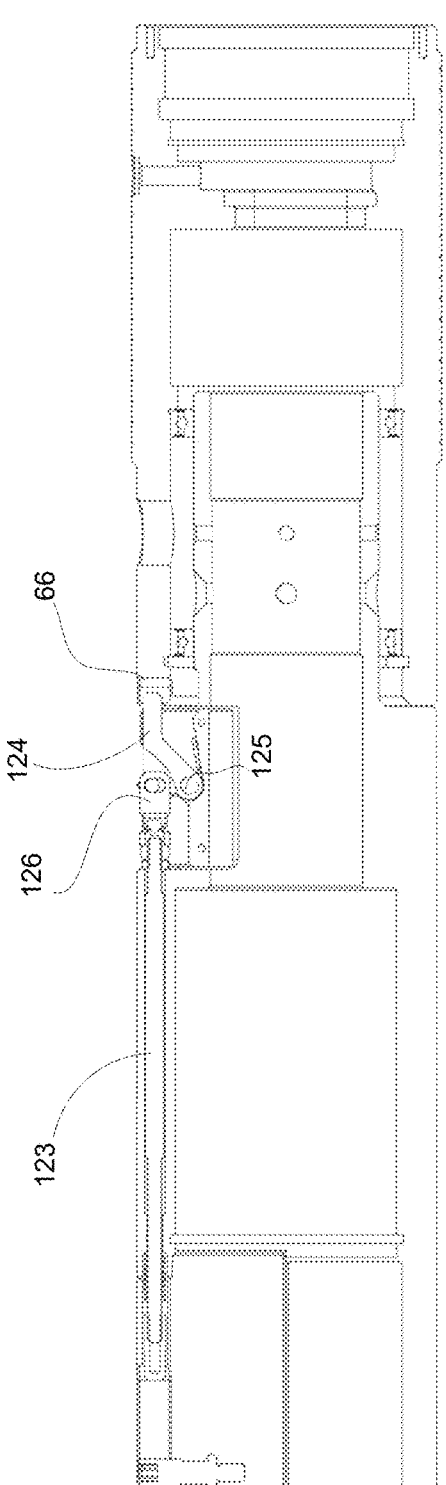
FIG. 8 illustrates an example of a vertical cross section of some parts of the manipulator.
Figure 8:
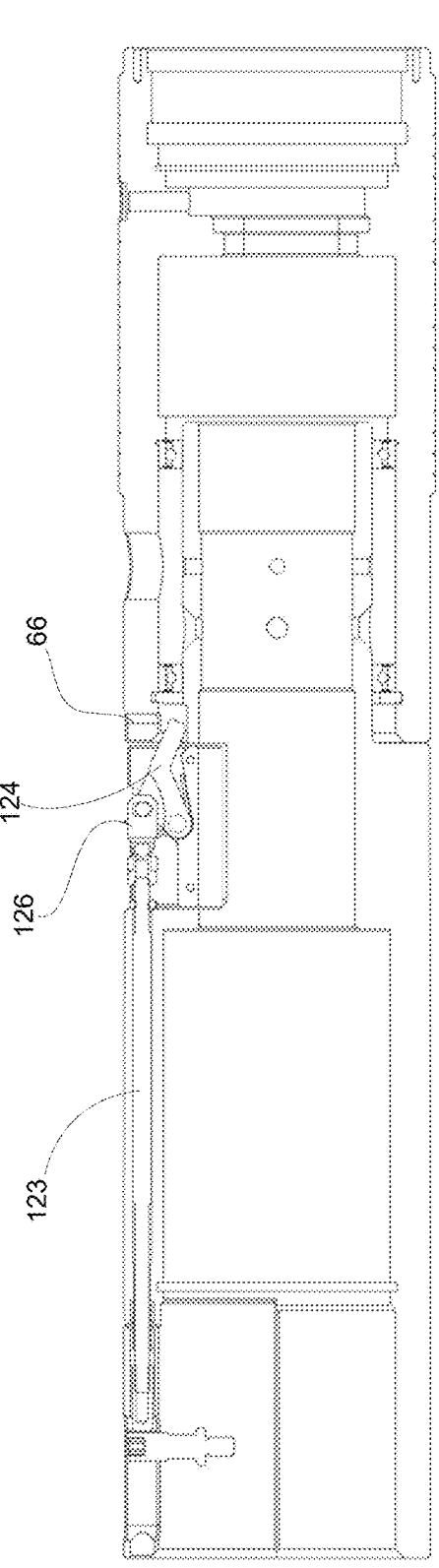

FIGS. 1-8 illustrates various parts of the manipulator.

According to an embodiment there is provide a manipulator 10. The manipulator 10 includes:

a. A vacuum chamber interface 20 that is configured to be detachably coupled to a vacuum chamber (a part of the sidewall of the vacuum chamber is denoted 199 in FIG. 2).

b. A shaft 30. The shaft is movable. When positioned at a proximal position, the shaft extends through the vacuum chamber interface. When the manipulator is detached to the vacuum chamber and when in the proximal position, the shaft interacts with one or more objects within the vacuum chamber. For example—a rotation of the shaft results in rotating a aperture holder. The shaft is illustrated as including a proximal end that is end effector 39. The proximal end of the shaft may be of different shapes and sizes.

c. A proximal enclosure 40 that surrounds a proximal portion of the shaft.

d. A proximal housing 50 that surrounds the proximal enclosure.

e. A distal housing 60 that is movable in relation to the shaft and the proximal housing.

f. A rotational movement unit 70 configured to translate a rotational movement of the distal housing to a rotational movement of the shaft. The distal housing may be moved by a person, motorized, or may be moved by a mechanical unit or an electrical unit.

g. A linear movement unit 80 configured to translate a linear movement of the distal housing to a linear movement of the shaft and of the proximal enclosure.

h. A rotational movement bellow 90 configured to maintain a vacuum environment around the shaft during the rotational movement of the shaft.

i. A linear movement bellow 100 configured to maintain the vacuum environment around the shaft during the linear movement of the shaft.

The vacuum supplied from the vacuum chamber is maintained within inner space 200 that is formed by the proximal enclosure 40, the linear movement bellow 100, an interior of a linear movement interface 110, and the rotational movement bellow 90.

According to an embodiment, the linear movement unit 80 includes a linear movement interface 110 that is configured to linearly move the shaft in relation to the proximal enclosure 40.

According to an embodiment, the linear movement bellows 100 is located between a proximal side 111 of the linear movement interface 110 and a distal side 41 of the proximal housing 40.

According to an embodiment, the rotational movement bellows 90 is located between a distal side 112 of the linear movement interface 110 and the rotational movement unit 80.

According to an embodiment, the manipulator includes a rotational limiter 120 that is configured to prevent the rotational movement of the distal housing 60 until a defined linear movement of the distal housing is completed. The defined movement is determined by a distance between stop 180 and a rod 123 of the rotational limiter, when the shaft is located at a distal position-more distant from the vacuum chamber sidewall.

The rotational limiter 120 includes:

a. A movable mechanical stopper 124 that is movable between (i) a stop position in which a part of the movable mechanical stopper 124 is located within an opening 66 of the distal housing-therefor preventing the rotation of the distal housing, and (ii) an open position in which the part of the movable mechanical stopper 124 is located below the opening 66—which allows the distal housing to rotate. The movable mechanical stopper 124 is configured to rotate about stopper axis 125 that is supported by housing 129.

b. A rod 123 that is configured to maintain the movable mechanical stopper 124 at the stop position until the distal housing 60 is moved towards the vacuum chamber for at least a defined second distance, to cause rod 123 to contact stop 180—thereby causing a rod interface 126 connected to rod 123 to move the movable mechanical stopper to the open position.

According to an embodiment, the rotational movement unit comprises an arm 73 that is connected between a shaft holder 74 and a base 75 that follows a rotation of the distal housing.

According to an embodiment, the rotational movement bellows 90 surrounds a proximal part of the base 75, the arm 73 and a distal part of the shaft holder 74.

According to an embodiment, the manipulator includes a torque selector 130 that is configured to select an angle of the arm 73 in relation to the shaft 30. The selection of the angle also selects the rotational torque applied on the shaft by the rotational movement unit 70.

The torque selector 130 has an interface 791 that is connected to a radius setting element 79. The rotation of the torque selector, between a set of predefined rotation angles (defined, at least in part by recesses 792 and corresponding perturbations (not shown)) defines a distance 201 between a virtual axis of rotation 77-1 and an interconnect 77 that connects the radius setting element 79 to base supporter 78 that supports the base 75—thereby determining the angle of arm 73.

Especially—the rotation of the torque selector rotates a spiral recess 76 (in which the interconnect 77 is located)— and determines distance 201.

Following a setting of the distance-a rotation of the distal housing (for example by a rotation of handle 170) causes base 75 to rotate in a circle having a radius correspondence to distance 201, and a center concentric with the inner shaft axis.

According to an embodiment the linear movement bellow 100 includes a proximal linear movement flange 105 and a distal linear movement flange 106. The rotational movement bellow 90 includes a proximal rotational movement flange 97 and a distal rotational movement flange 96. According to an embodiment one or more of the bellows terminates with a welded end—or by a means that differ from having flanges.

According to an embodiment, the manipulator 10 includes first balls 143 and a first linear movement ball cage 144 configured to hold the first balls while allowing a rotation of the first balls, wherein the first balls are located between an interior of the proximal housing 50 and an exterior of the proximal enclosure 40.

According to an embodiment, the manipulator includes second balls 153 and a second linear movement ball cage 154 configured to hold the second balls while allowing a rotation of the second balls, wherein the second balls are located between an interior of the proximal enclosure 40 and an exterior of the shaft 30. Various figures illustrate a pair of spaced apart second linear movement ball cages each with second balls.

It will be appreciated that for simplicity and clarity of illustration, elements shown in the figures may be either of scale or may have been drawn out of scale. For example, the dimensions of some of the elements may be exaggerated relative to other elements for clarity. Yet for another example—the dimensions of elements are of scale. Further, where considered appropriate, reference numerals may be repeated among the figures to indicate corresponding or analogous elements.

In the foregoing detailed description, numerous specific details are set forth in order to provide a thorough understanding of the embodiments of the disclosure.

However, it will be understood by those skilled in the art that the present embodiments of the disclosure may be practiced without these specific details. In other instances, well-known methods, procedures, and components have not been described in detail so as not to obscure the present embodiments of the disclosure.

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may for the most part, be implemented using mechanical components and circuits known to those skilled in the art, details will not be explained in any greater extent than that considered necessary as illustrated above, for the understanding and appreciation of the underlying concepts of the present embodiments of the disclosure and in order not to obfuscate or distract from the teachings of the present embodiments of the disclosure.

Any reference in the specification to a method should be applied mutatis mutandis to a manipulator capable of executing the method.

Any reference in the specification to a manipulator should be applied mutatis mutandis to a method that may be executed by the manipulator.

The term "and/or" means additionally or alternatively. For example A and/or B means only A, or only B or A and B.

In the foregoing description, numerous specific details are set forth in order to provide a thorough understanding of the embodiments of the disclosure.

However, it will be understood by those skilled in the art that the present embodiments of the disclosure may be practiced without these specific details. In other instances, well-known methods, procedures, and components have not been described in detail so as not to obscure the present embodiments of the disclosure.

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Any reference in the specification to a support unit should be applied mutatis mutandis to a method that may be executed by the support unit.

The term "and/or" means additionally or alternatively. For example, A and/or B means only A, or only B or A and B.

In the foregoing specification, the embodiments of the disclosure have been described with reference to specific examples of embodiments. It will, however, be evident that various modifications and changes may be made therein without departing from the broader spirit and scope of the appended claims.

Moreover, the terms "front," "back," "top,", "bottom," "over," "under" and the like in the description and in the claims, if any, are used for descriptive purposes and not necessarily for describing permanent relative positions. It is understood that the terms so used are interchangeable under appropriate circumstances such that the embodiments of the disclosure described herein are, for example, capable of operation in other orientations than those illustrated or otherwise described herein.

Any reference to the term "comprising" or "having" or "including" should be applied mutatis mutandis to "consisting" and/or should be applied mutatis mutandis to "consisting essentially of".

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to embodiments containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the embodiments have been illustrated and described herein, many modifications, substitutions, changes, and equivalents will now occur to those of ordinary skill in the art. It is, therefore, to be understood that the appended claims are intended to cover all such modifications and changes as fall within the true spirit of the embodiment.

I claim:

1. A manipulator, comprising:
a vacuum chamber interface that is configured to be detachably coupled to a vacuum chamber;
a shaft;
a proximal enclosure that surrounds a proximal portion of the shaft; wherein the shaft, when positioned at a proximal position, extends through the vacuum chamber interface;
a proximal housing that surrounds the proximal enclosure;
a distal housing;
a rotational movement unit configured to transfer a rotational movement of the distal housing to a rotational movement of the shaft;

a linear movement unit configured to transfer a linear movement of the distal housing to a linear movement of the shaft;

a rotational movement bellows configured to maintain a vacuum environment around the shaft during the rotational movement of the shaft; and a linear movement bellows configured to maintain the vacuum environment around the shaft during the linear movement of the shaft.

2. The manipulator according to claim 1, comprising a rotational limiter that is configured to prevent the rotational movement of the distal housing until a defined linear movement of the distal housing is completed.

3. The manipulator according to claim 1, comprising a torque selector that is configured to select a rotational torque applied on the shaft by the rotational movement unit.

4. The manipulator according to claim 1, comprising first balls and a first linear movement ball cage configured to hold the first balls while allowing a rotation of the first balls, wherein the first balls are located between an interior of the proximal housing and an exterior of the proximal enclosure.

5. The manipulator according to claim 1, comprising second balls and a second linear movement ball cage configured to hold the second balls while allowing a rotation of the second balls, wherein the second balls are located between an interior of the proximal enclosure and an exterior of the shaft.

6. The manipulator according to claim 1, wherein the rotational movement bellows and the linear movement bellows are made of metal.

7. The manipulator according to claim 1, wherein the linear movement unit comprises a linear movement interface that is configured to linearly move the shaft in relation to the proximal enclosure, wherein the linear movement bellows is located between a proximal side of the linear movement interface and a distal side of the proximal housing.

8. The manipulator according to claim 7, wherein the rotational movement bellows is located between a distal side of the linear movement interface and a distal portion of the rotational movement unit.

9. The manipulator according to claim 1, wherein the rotational movement unit comprises an arm that is connected between a shaft holder and a base that follows a rotation of the distal housing.

10. The manipulator according to claim 9, wherein the rotational movement bellows surrounds a proximal part of the base, the arm and a distal part of the shaft holder.

11. The manipulator according to claim 9, comprising a torque selector that is configured to select an angle of the arm in relation to the shaft holder.

* * * * *